United States Patent
Caponetti et al.

(10) Patent No.: US 11,396,862 B2
(45) Date of Patent: Jul. 26, 2022

(54) POSITION BASED VIBRATION REDUCTION OF NACELLE MOVEMENT

(71) Applicant: VESTAS WIND SYSTEMS A/S, Aarhus N (DK)

(72) Inventors: Fabio Caponetti, Åbyhøj (DK); Jesper Sandberg Thomsen, Hadsten (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 107 days.

(21) Appl. No.: 16/484,745

(22) PCT Filed: Jan. 30, 2018

(86) PCT No.: PCT/DK2018/050018
§ 371 (c)(1),
(2) Date: Aug. 8, 2019

(87) PCT Pub. No.: WO2018/145710
PCT Pub. Date: Aug. 16, 2018

(65) Prior Publication Data
US 2020/0011296 A1    Jan. 9, 2020

(30) Foreign Application Priority Data
Feb. 10, 2017  (DK) .............................. PA201770088

(51) Int. Cl.
*F03D 7/02* (2006.01)
*F03D 7/04* (2006.01)

(52) U.S. Cl.
CPC ......... *F03D 7/0296* (2013.01); *F03D 7/0224* (2013.01); *F03D 7/042* (2013.01);
(Continued)

(58) Field of Classification Search
CPC ...... F03D 7/0296; F03D 7/0224; F03D 7/042; F05B 2260/96; F05B 2270/327;
(Continued)

(56) References Cited

U.S. PATENT DOCUMENTS

2006/0033338 A1    2/2006  Wilson
2010/0045038 A1*   2/2010  Skaare ................. F03D 7/0224
                                                        290/44

(Continued)

FOREIGN PATENT DOCUMENTS

CN    102032110 A    4/2011
CN    103321854 A    9/2013
(Continued)

OTHER PUBLICATIONS

Van der Temple, Jan, and Molenaar, David-Peter, "Wind Turbine Structural Dynamics—A Review of the PRinciples for Modern Power Generation, Onshore and Offshore", 2002, Journal of Wind Engineering, vol. 26, No. 4, pp. 211-220 (Year: 2002).*

(Continued)

*Primary Examiner* — Justin D Seabe
*Assistant Examiner* — Eric A Lange
(74) *Attorney, Agent, or Firm* — Patterson + Sheridan, LLP

(57) ABSTRACT

The present invention relates to control of a wind turbine where nacelle vibration is reduced by use of blade pitching. The nacelle vibrations are reduced based on a position signal of the nacelle. A pitch signal is determined based on the position signal and applied to the pitch-adjustable rotor blades in order to reduce nacelle vibration.

14 Claims, 3 Drawing Sheets

(52) U.S. Cl.
  CPC ..... *F05B 2260/96* (2013.01); *F05B 2270/327* (2013.01); *F05B 2270/807* (2013.01)

(58) Field of Classification Search
  CPC .......... F05B 2270/807; F05B 2270/309; F05B 2270/334; Y02E 10/72
  See application file for complete search history.

(56) References Cited

U.S. PATENT DOCUMENTS

| | | | | |
|---|---|---|---|---|
| 2010/0119369 A1* | 5/2010 | Risager | ................ | F03D 7/0224 416/1 |
| 2011/0316277 A1* | 12/2011 | Skaare | ................... | F03D 7/043 290/44 |
| 2012/0056427 A1* | 3/2012 | Drossel | ................ | F03D 7/0276 290/44 |
| 2014/0003936 A1* | 1/2014 | Agarwal | ............... | F03D 7/0276 416/1 |
| 2015/0377213 A1* | 12/2015 | Deshpande | ............. | F03D 9/257 290/44 |
| 2016/0377057 A1 | 12/2016 | Caponetti et al. | | |
| 2016/0377058 A1 | 12/2016 | Caponetti et al. | | |

FOREIGN PATENT DOCUMENTS

| | | | | |
|---|---|---|---|---|
| CN | 105298749 A | 2/2016 | | |
| EP | 2115299 A1 | 11/2009 | | |
| EP | 2679810 A2 | 1/2014 | | |
| EP | 2963283 A1 | 1/2016 | | |
| WO | 20100060772 A2 | 6/2010 | | |
| WO | WO-2010060772 A2 * | 6/2010 | .......... | F03D 7/0296 |
| WO | 2010139613 A2 | 12/2010 | | |
| WO | WO-2015086023 A1 * | 6/2015 | ............ | F03D 7/024 |
| WO | 2018145710 A1 | 8/2018 | | |

OTHER PUBLICATIONS

"Integral Action and PI Control", Apr. 7, 2015, https://controlguru.com/integral-action-and-pi-control/, pp. 1-6 Date accessed: Jun. 8, 2021 (Year: 2015).*
Chinese Office Action for Application No. 201880024194.5 dated Jul. 2, 2020.
PCT Written Opinion of the International Searching Authority for Application No. PCT/DK2018/050018 dated Aug. 7, 2017.
Nourdine S et al: "Comparison of wind turbine LOG controllers designed to alleviate fatigue loads", Control and Automation (ICCA), 2010 8th IEEE International Conference on, IEEE, Piscataway, NJ, USA, Jun. 9, 2010, pp. 1502-1507.
PCT International Search Report for Application No. PCT/DK2018/050018 dated Apr. 20, 2018.
Danish Patent and Trademark Office First Technical Examination for Application No. PA 2017 70088 dated Aug. 7, 2017.

* cited by examiner

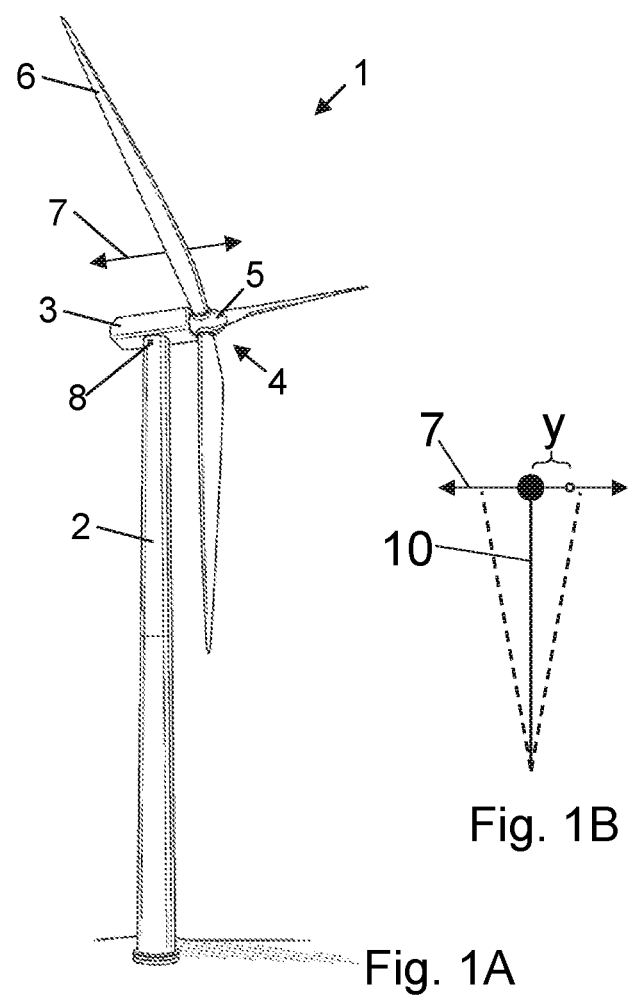
Fig. 1A
Fig. 1B
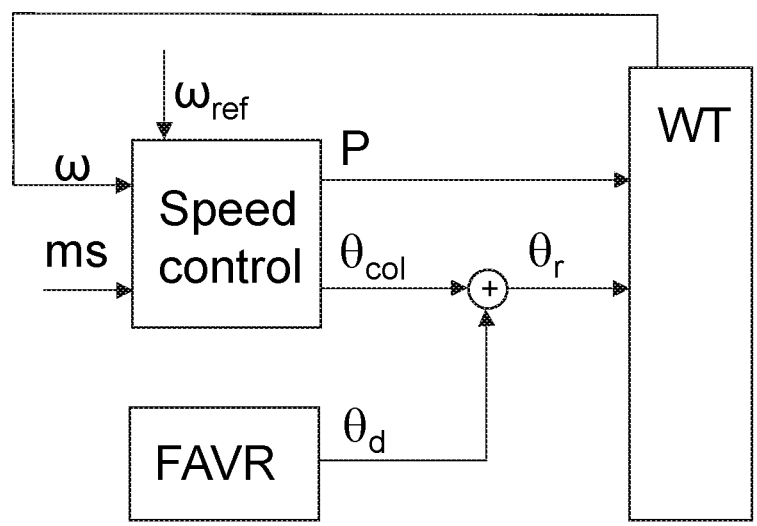
Fig. 2

POSITION BASED VIBRATION REDUCTION OF NACELLE MOVEMENT

FIELD OF THE INVENTION

The present invention relates to control of a wind turbine where nacelle vibration is reduced by use of blade pitching.

BACKGROUND OF THE INVENTION

Wind turbines as known in the art comprises a wind turbine tower supporting a nacelle and a rotor with a number of pitch-adjustable rotor blades. An exemplary wind turbine is a horizontal axis wind turbine with a nacelle positioned at the tower top, but also multi-rotor structures are known, such as a multi-rotor turbine with nacelles positioned at a tower structure in the form of one or more support arms extending from a central tower structure.

A wind turbine is prone vibrations since it comprises a large mass placed at the end of a slender tower or tower structure. These vibrations include nacelle movement in the lateral direction as well as in the fore-aft direction. It is known in the art that the vibrations can be damped by actively pitching of the blades to generate counter forces to reduce the nacelle movement.

In this regard, a collective adjustment of the blade pitch, where all rotor blades are adjusted by the same pitch angle, can be used to counteract oscillations in the fore-aft direction. This is accomplished by modifying the thrust force. For lateral vibrations, an individual blade pitch adjustment may be used to counteract a lateral oscillation of the tower. The individual blade pitch adjustment provides individual pitch angle settings for each rotor blade to generate a resulting lateral force.

In U.S. Pat. No. 7,692,322 (Mitsubishi Heavy Industries) a wind turbine with an active damping method is described. In this patent document, fore-aft nacelle vibrations are described to be damped by determining a collective pitch angle adjustment for generating a thrust on the rotor blades so as to cancel out the vibrations of the nacelle. The collective pitch angle adjustment is based on a speed estimation of the nacelle movement, as determined from a detected acceleration signal in the fore-aft direction.

It is against this background that the invention has been devised.

SUMMARY OF THE INVENTION

It would be advantageous to achieve improved means for damping of nacelle movement. In this regard, it would be advantageous to provide improved means for damping of the nacelle movement in the fore-aft direction.

It has been realized by the inventors of the present invention that when using active pitching to damp tower vibrations there is a risk of self-induced resonances between the speed controller of the wind turbine control system and the tower. In particular, there is a risk of an undesired coupling in tall and/or soft towers.

In damping control of wind turbines, the control law may be based on an emulation of the wind turbine system as a viscous damper (spring-mass system) where the displacement of the nacelle in the form of an object with a given mass is governed by a second order differential motion equation including a damping coefficient and a stiffness coefficient (spring constant). Such a system may be damped by imposing a damping force which is opposite to the velocity of the mass (i.e. the nacelle and rotor). This may be done by imposing a collective pitch adjustment which is based on the determined velocity of the nacelle movement in the fore-aft direction.

However at the same time, the collective pitch setting is determined based on the rotor speed controller which seeks to control the rotor speed dynamics around a given operating point by determining a collective pitch setting in view of rotor speed changes.

When the tower moves in the fore-aft direction, the local wind speed experienced by the rotor will oscillate with the tower movement. When the collective pitch angle is varied to regulate the rotor speed, the tower is affected at the same time. And when affecting the tower motion to reduce the vibration, the rotor dynamics is affected via the local wind speed influence, which again will influence the regulation of the rotor speed via the collective pitch adjustment. This may lead to undesired self-induced resonances between the speed controller of the wind turbine control system and the tower.

In a first aspect of the present invention, there is provided a method of controlling a wind turbine, the wind turbine comprising a tower structure supporting a nacelle and a rotor with a number of pitch-adjustable rotor blades, the method comprises:

obtain a position signal indicative of a position of the nacelle;

determine a first pitch signal based on the position signal, the first pitch signal being determined to reduce nacelle vibration; and apply the first pitch signal to the pitch-adjustable rotor blades.

By basing the pitch signal on the position of the nacelle a stabilization of the nacelle movement is obtained, and an undesired vibration of the nacelle movement can be reduced in a simple, yet robust, control strategy, which limits or even avoids problems with undesired couplings between the wind turbine control system and the tower.

The advantage may be most pronounced for tall and/or soft towers or tower structures.

In this regard, a soft tower/tower structure can understood as a tower structure with a first structural mode frequency of the tower structure is in the frequency range between 0.025 Hz and 0.3 Hz. This frequency range may advantageously be in the range of 0.1 Hz to 0.2 Hz. Additional also tower stiffness and rotor controller bandwidth may be taken into account in order to characterize a tower as a soft tower. Characteristics of "soft towers" are often found for tall towers, such as for towers with hub heights above 100 m.

In further aspects there are provided a computer program product comprising software code adapted to control a wind turbine in accordance with the first aspect when executed on a data processing system.

Further aspects also include a control system for a wind turbine with proper hardware equipment, including input and output modules for handling control signals and processing modules for implementing the method of the first aspect. Moreover, a wind turbine is provided which comprises the control system.

The computer program product may be provided on a computer readable storage medium or being downloadable from a communication network. The computer program product comprise instructions to cause a data processing system, e.g. in the form of a controller, to carry out the instruction when loaded onto the data processing system.

In general, a controller may be a unit or collection of functional units which comprises one or more processors, input/output interface(s) and a memory capable of storing instructions that can be executed by a processor.

In general the various aspects of the invention may be combined and coupled in any way possible within the scope of the invention. These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the drawings, in which FIG. 1 illustrates a wind turbine (FIG. 1A) together with a schematic view of fore-aft vibrational movement (FIG. 1B);

FIG. 2 illustrates a general control scheme for an embodiment;

DESCRIPTION OF EMBODIMENTS

Figure 3:
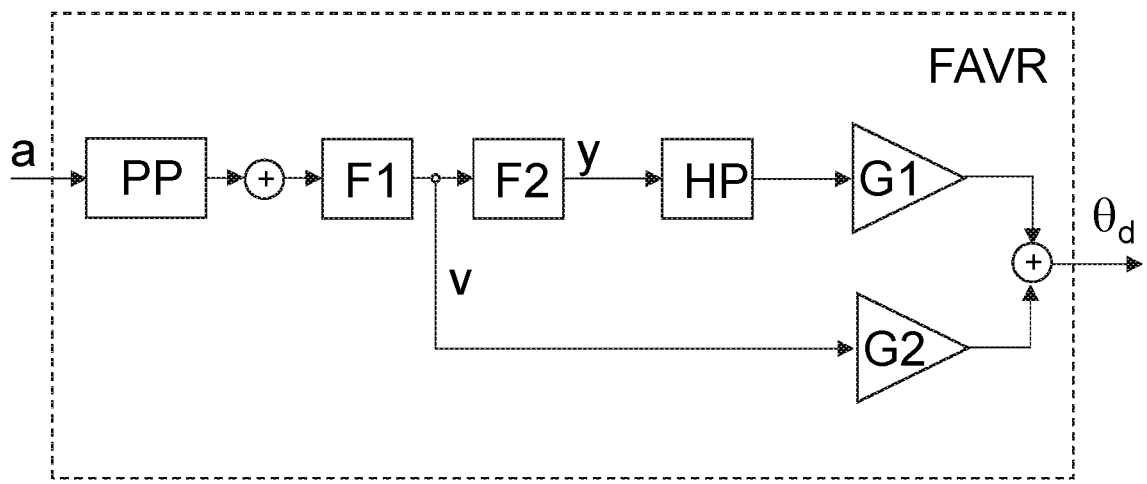
FIG. 3 illustrates an embodiment of a fore-aft vibration reduction unit.

FIG. 1A illustrates, in a schematic perspective view, an example of a wind turbine 1. The wind turbine 1 includes a tower 2, a nacelle 3 disposed at the apex of the tower, and a rotor 4 operatively coupled to a generator housed inside the nacelle 3. In addition to the generator, the nacelle houses miscellaneous components required for converting wind energy into electrical energy and various components needed to operate, control, and optimize the performance of the wind turbine 1. The rotor 4 of wind turbine includes a central hub 5 and a plurality of blades 6 that project outwardly from the central hub 5. In the illustrated embodiment, the rotor 4 includes three blades 6, but the number may vary. Moreover, the wind turbine comprises a control system. The control system may be placed inside the nacelle or distributed at a number of locations inside (or externally to) the turbine and communicatively connected. The rotor blades are pitch-adjustable. The rotor blades may at least be adjustable in accordance with a collective pitch setting, where each of the blades are set to the same pitch value. In addition to that, the rotor blades may also be adjustable in accordance with individual pitch settings, where each blade may be provided with an individual pitch setting.

The turbine may vibrate in the fore-aft direction 7, that is the direction perpendicular to the rotor plane. Aspects of such vibration is schematically illustrated in FIG. 1B. In this figure, the turbine is schematically illustrated by a tower structure fixed in one end and provided with a mass at the free end, referred to by reference numeral 10. When the tower top vibrates in the fore-aft direction 7, the position, y, characteristic of the nacelle position, varies between two maxima defined by the maximum tower deflection during the vibration. The position, y, may be a position representative of the nacelle position in a direction defined by the fore-aft movement. The position may, e.g., be a centre-of-mass position of the nacelle, the position of the relevant sensor, or position of other fix-points which represent the movement of the nacelle in the fore-aft direction.

In a general embodiment of the present invention vibrational movement is reduced in the fore-aft direction 7 by the following general steps: Obtain a position signal indicative of a position of the nacelle, i.e. determine y. Based on the position signal determining a pitch signal for damping the nacelle movement in the fore-aft direction. Finally applying the pitch signal to the pitch-adjustable rotor blades.

This general embodiment is illustrated in FIG. 2, in the context of a feedback speed controller. A feedback speed controller is generally used in so-called full load mode, where there is sufficient energy in the wind, i.e. the wind speed is sufficiently high, in order for the wind turbine to operate at its rated power output. In one implementation, a full load speed controller minimizes a speed error ($\omega$-$\omega_{ref}$) between the actual generator speed, $\omega$, and a reference speed, $\omega_{ref}$, in order to output a requested power. This may be obtained by determining the collective pitch reference, based on a rotor speed, to be applied by the pitch-adjustable rotor blades of the wind turbine (WT). The feedback speed controller may be implemented by a PI, PID or similar control schemes, where a collective pitch reference is output in view of a speed error. In full load mode the wind turbine is operated to output a constant power output independent upon the wind speed by adjusting the collective pitch angle, that is controlled to keep the rotor speed constant at the rated speed by adjusting the collective pitch angle.

In a general embodiment, the resulting pitch reference $\theta_r$ is based on the position of the nacelle. This is implemented in the embodiment of FIG. 2 by determining the resulting pitch reference $\theta_r$ as a combination of a collective pitch reference $\theta_{col}$ as determined by the speed controller, and a pitch offset $\theta_d$, determined by a fore-aft vibration reduction unit (FAVR), to provide a reduction of the vibration, or damping of the nacelle movement, in the fore-aft direction.

The collective pitch reference is determined by the speed controller in view of the rotor speed and possibly also further sensor values, referred to in FIG. 2 as a measurement set, ms. The pitch offset is determined based on the position of the nacelle, e.g. by gain factor multiplied to a position value of the nacelle.

In a general embodiment, the position of the nacelle may be determined in any suitable way. In an embodiment discussed below in further detail, the position is determined based on a measured acceleration signal indicative of the nacelle movement, e.g. obtained from an accelerometer position at the tower top as shown schematically by reference numeral 8 on FIG. 1. Generally, the position signal may be obtained by other suitable means are arranged to output a signal indicative of the nacelle position, including but not limited to: a GPS signal, an inclinometer, an inertial measuring unit (IMU), a Kalman filter.

In an embodiment, the fore-aft vibration reduction unit FAVR is implemented to, in addition to the position, also taking into account a velocity signal indicative of a velocity of a movement of the nacelle in the fore-aft direction, and to determine a second pitch signal based on the velocity signal and apply the second pitch signal to the pitch-adjustable rotor blades. In this regard the position signal may be seen to be used for determining a first pitch signal.

The first pitch signal is determined to reduce nacelle vibration based on a position signal and the second pitch signal is determined to reduce nacelle vibration based on a velocity signal. Thus the pitch systems is actuated by either the first, the second or both pitch signals so that a thrust force is generated which results in a reduction of the position signal and/or the velocity signal. The determination of the first pitch signal to reduce nacelle vibration, and the determination of the second pitch signal to reduce nacelle vibration may be to determine a pitch signal based on a functional relationship between the position signal and/or the velocity signal and a pitch actuation which has a vibration reducing effect on the fore-aft movement.

The resulting pitch signal $\theta_r$ to the pitch-adjustable rotor blades may, in an embodiment where also the velocity is taken into account, be a combined signal of the collective pitch reference and the first pitch signal, or a combined signal of the collective pitch reference and the first pitch signal and the second pitch signal. The velocity signal may be obtained by any suitable means arranged to output a signal indicative of the nacelle velocity, including but not limited to a signal based on a GPS signal, an inclinometer signal, an inertial measuring unit (IMU) signal, a Kalman filter.

The velocity, v, may be a velocity representative of the nacelle velocity in a direction defined by the fore-aft movement. The velocity may, e.g., be a centre-of-mass velocity of the nacelle, the velocity of the relevant sensor, or velocity of other fix-points which represent the movement of the nacelle in the fore-aft direction.

FIG. 3 illustrates an embodiment of the FAVR unit of FIG. 2, where a measured accelerometer signal, a, is obtained by an accelerometer positioned so that the acceleration of the movement in the fore-aft direction of the nacelle is measured, cf. ref 8 on FIG. 1.

The acceleration signal may in general be used as a raw signal, however typically the signal is pre-processed PP to a certain extend. Such pre-processing may be the application of an anti-aliasing filter to remove any high frequency content which is not needed for the further use. Other filters, including other band-pass filter may be applied during the pre-processing.

The acceleration signal (or pre-processed version of it) is further processed by applying a series of filters to the signal. In the illustrated embodiment, an estimated position signal, y, indicative of a position of the tower top is obtained by applying in series a first integration (F1) of the acceleration signal to obtain an estimated velocity signal, v, and a second integration (F2) of the velocity signal to obtain the position signal, y. In general any suitable filters which integrate the input signal can be applied. In an embodiment, the first and second integrations may be implemented as leaky integrators. The leaky integrators can be implemented as 1st order low pass filters tuned with a break frequency below the 1st fore-aft mode frequency, the frequency being the system frequency comprising the tower, rotor, nacelle, and optionally also foundation.

The first pitch signal to the pitch-adjustable rotor blades, which in the illustrated embodiment is pitch offset $\theta_d$ may be determined as the estimated position, y, multiplied with a first gain G1.

In an embodiment, the speed signal indicative of a speed of a movement of the tower top may be obtained as the estimated velocity signal v, which results after the first integration F1.

The second pitch signal to the pitch-adjustable rotor blades may be determined as the estimated velocity, v, multiplied with a second gain G2. The gains (G1, G2) may be determined based on standard methods to tune control loops.

In this embodiment, the pitch signal to be added to the collective pitch signal, i.e. the pitch offset $\theta_d$, is sum of the first (position) and second (velocity) pitch signals. As described, the invention may in an embodiment be implemented by basing the pitch offset only on the position signal. In such an embodiment, this may be obtained by setting the gain G2 to zero.

In a further embodiment, also illustrated in FIG. 3, the position signal is high-pass filtered (HP) prior to determining the first pitch signal. By high-pass filtering the estimated position, it can be ensured that only vibrations around the specific operating point is damped. When basing the vibration reduction on a position feedback, the controller will force the position to a reference position. By applying a high-pass filter to the position signal the vibration is reduced with respect to the current operating point of the nacelle without the need to define a reference position.

A general advantage of the embodiment described in connection with FIGS. 2 and 3 is that position and velocity measurements or estimates do not have to have correct absolute values, as long as the signals correlate with the real values in the frequency area of interest.

Figure 4:
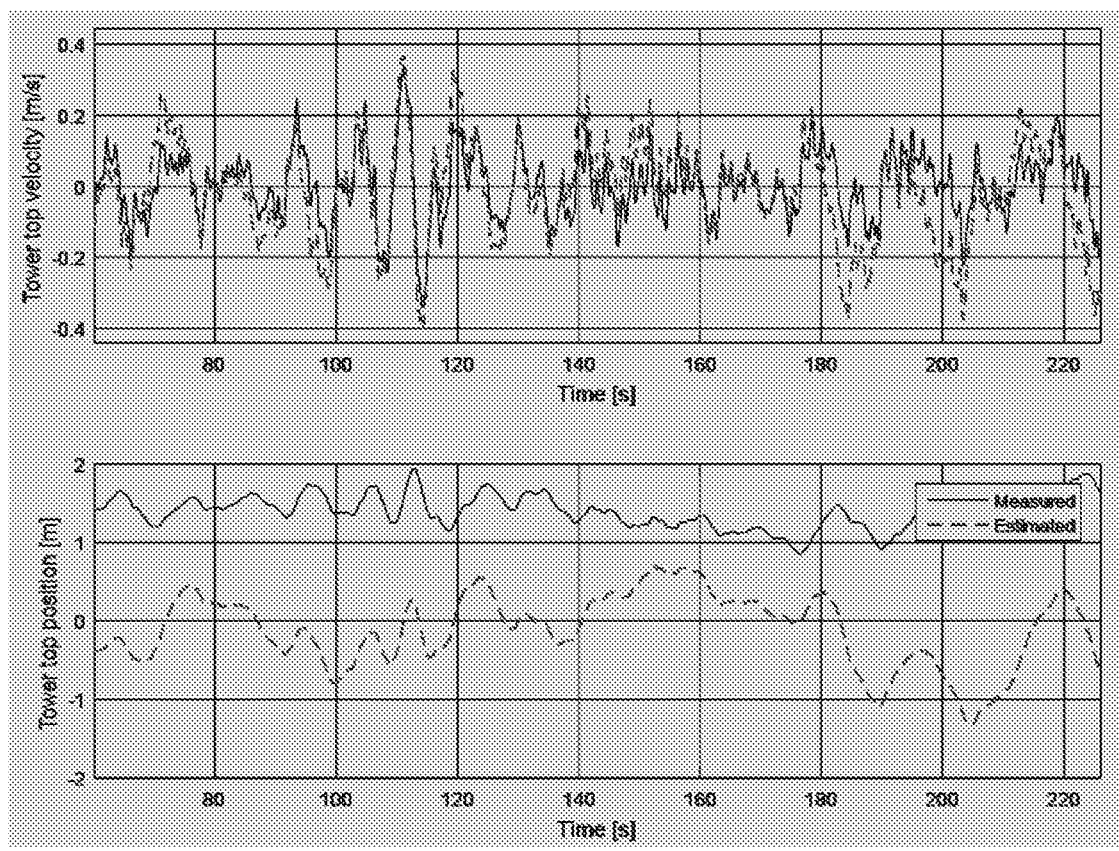
FIG. 4 and FIG. 5 illustrate example plots.

FIG. 4 illustrates time traces of a velocity estimate (top) and a position estimate (bottom) obtained by the method as defined in FIG. 3. As can be seen, the estimated signals follow the measured signal. The estimated position is due to the high pass filter (HP) centred around zero.

Figure 5:
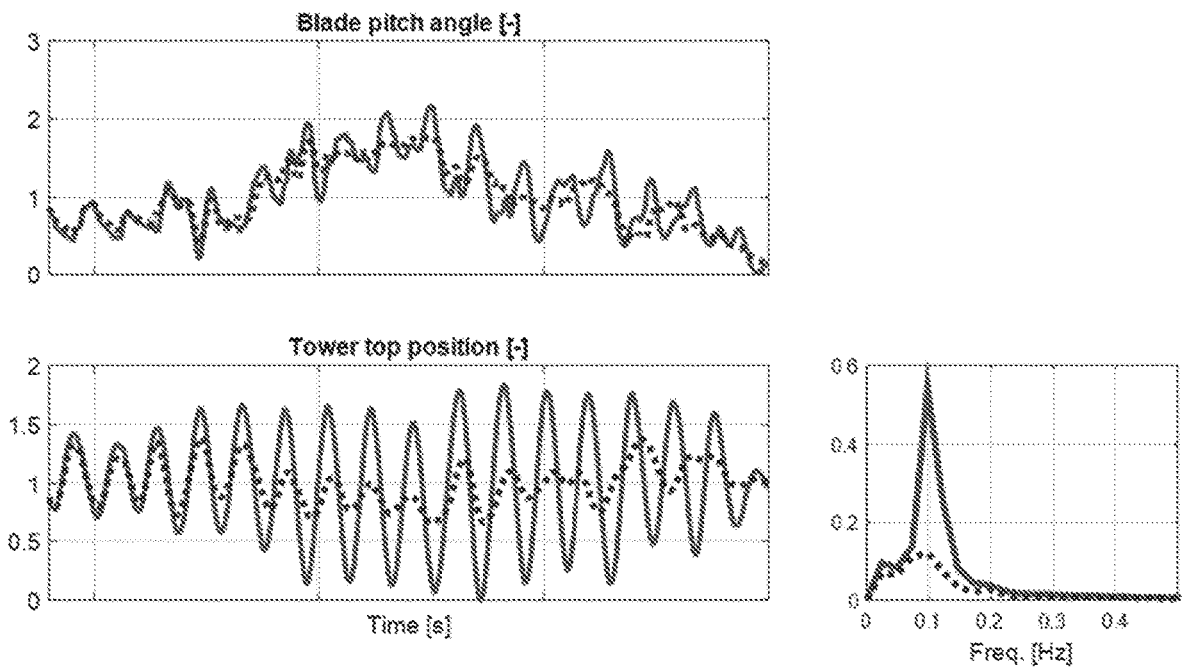

FIG. 5 illustrates a time series of resulting pitch angle and tower top position by applying a pitch offset to the collective pitch as determined by embodiments of the present invention.

In the top figure, the pitch angle is shown with a pitch offset added to the collective pitch (dotted line) and without the pitch offset added (full line). As can be seen, only a slight pitch variation is superimposed.

In the bottom figure a simulated tower top position is shown in a situation where tower vibrations are reduced by application of the pitch offset (dotted line) as compared to a situation where tower vibration reduction is not performed (full line). The bottom figure also shows a fast Fourier transform (FFT) of the tower top position.

As can be seen the tower top position is generally reduced by application of the damping method. This is reflected in the frequency plot as the resonance at 0.1 Hz is reduced.

Figure 6:
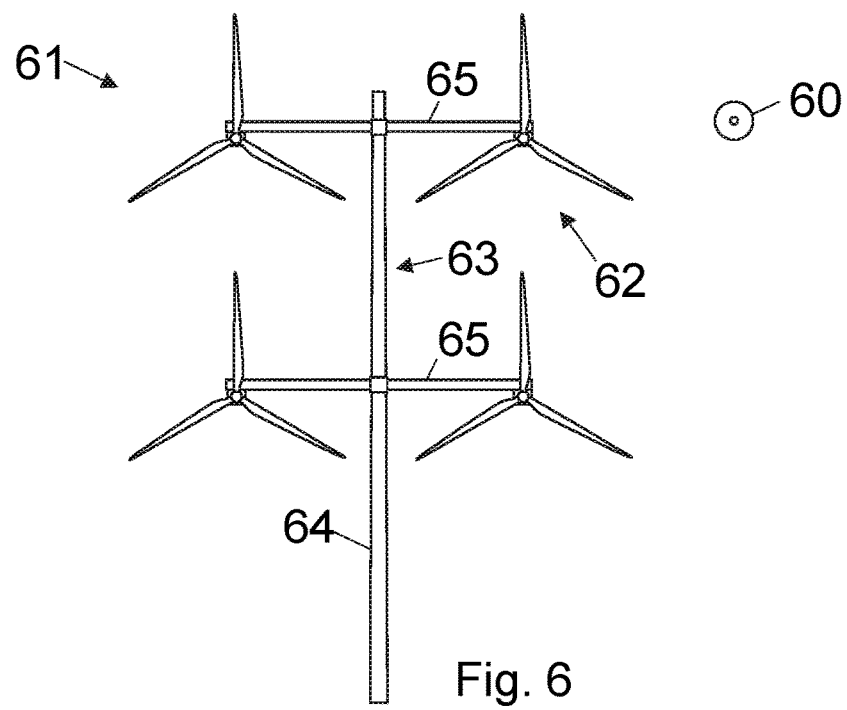
FIG. 6 illustrates a multi-rotor wind turbine.

FIG. 6 illustrates an example of multi-rotor turbine 61 with four nacelle modules (wind turbine module) 62 mounted to a common support structure 63. Each wind turbine module is a wind turbine generating entity, and may in principle be the generating part of a common single-rotor wind turbine including rotor, generator, converter, etc., while the support structure 63 is one part of a tower structure 64 comprising parts of a tower structure in the form of support arm arrangements 65 for holding the wind turbine modules. The multi-rotor layout may be different from the one shown, comprising more or fewer nacelle modules, arranged in a different manner to the common support structure.

Each nacelle module may vibrate in a fore-aft direction 60 (in and out in the paper plane). In an embodiment of the present invention, such vibrations may be damped by application of the method described for the single rotor turbine. A pitch offset may be determined for each wind turbine module based on an acceleration measurement in the fore-aft direction of each wind turbine module, an accelerometer may be arranged for each wind turbine module to measure the acceleration of the associated nacelle. The method may be implemented for each of the wind turbine modules.

Although the present invention has been described in connection with the specified embodiments, it should not be construed as being in any way limited to the presented examples. The invention can be implemented by any suitable means; and the scope of the present invention is to be interpreted in the light of the accompanying claim set. Any reference signs in the claims should not be construed as limiting the scope.

The invention claimed is:

1. A method of controlling a wind turbine, the wind turbine comprising a tower structure supporting a nacelle and a rotor with pitch-adjustable rotor blades, the method comprising:
   obtaining a position signal indicative of a position of the nacelle;
   obtaining a velocity signal indicative of a velocity of a movement of the nacelle;
   determining a first pitch signal based on the position signal multiplied by a gain, the first pitch signal being determined to reduce nacelle vibration;
   determining a second pitch signal based on the velocity signal, the second pitch signal being determined to reduce nacelle vibration;
   determining a collective pitch reference for the pitch-adjustable rotor blades, the collective pitch reference being determined based on a rotor speed and a sensor value; and
   applying a resulting pitch signal to the pitch-adjustable rotor blades, the resulting pitch signal being a sum of the collective pitch reference, the first pitch signal, and the second pitch signal.

2. The method according to claim 1, wherein the collective pitch reference is determined by feedback control based on minimizing a speed error between the rotor speed and a reference rotor speed.

3. The method according to claim 1, wherein the resulting pitch signal is applied to the pitch-adjustable rotor blades in a full load control mode.

4. The method according to claim 1, wherein the position of the nacelle is indicative of a positioning of the nacelle in a fore-aft direction, or wherein the velocity of the movement of the nacelle is indicative of the velocity of the movement of the nacelle in the fore-aft direction.

5. The method according to claim 1, wherein the wind turbine comprises an accelerometer positioned to measure an acceleration signal of the nacelle, and wherein the method further comprises:
   obtaining the acceleration signal in a fore-aft direction;
   filtering, using at least one of an anti-aliasing filter and a band pass filter, the acceleration signal; and
   obtaining the position signal indicative of a position of a tower top in the fore-aft direction as an estimated position signal by applying in series a first integration of the filtered acceleration signal to obtain an estimated velocity signal and a second integration of the estimated velocity signal to obtain the position signal.

6. The method according to claim 5 wherein the velocity signal indicative of a velocity of a movement of the tower top is the estimated velocity signal.

7. The method according to claim 5, wherein the second pitch signal to the pitch-adjustable rotor blades is determined as the estimated velocity signal multiplied with a second gain.

8. The method according to claim 1, wherein the position signal is high-pass filtered prior to determining the first pitch signal.

9. The method according to claim 1, wherein a first structural mode frequency of the tower structure is in a frequency range between 0.025 Hz and 0.3 Hz.

10. A control system for a wind turbine comprising a tower structure supporting a nacelle and a rotor with pitch-adjustable rotor blades, the control system comprising:
    an input module arranged to obtain a position signal indicative of a position of the nacelle and to obtain a velocity signal indicative of a velocity of a movement of the nacelle;
    a processing module arranged to:
       determine a first pitch signal based on the position signal multiplied by a gain, the first pitch signal being determined to reduce nacelle vibration;
       determine a second pitch signal based on the velocity signal, the second pitch signal being determined to reduce nacelle vibration; and
       determine a collective pitch reference for the pitch-adjustable rotor blades, the collective pitch reference being determined based on a rotor speed and a sensor value; and
    a pitch system arrange to apply a resulting pitch signal to the pitch-adjustable rotor blades, the resulting pitch signal being a sum of the collective pitch reference, the first pitch signal, and the second pitch signal.

11. A wind turbine, comprising:
    a tower structure;
    a nacelle disposed on the tower structure;
    a rotor extending from the nacelle and having a plurality of pitch-adjustable rotor blades disposed at a distal end thereof;
    a control system configured to perform an operation, comprising:
       obtaining a position signal indicative of a position of the nacelle;
       obtaining a velocity signal indicative of a velocity of a movement of the nacelle;
       determining a first pitch signal based on the position signal multiplied by a gain, the first pitch signal being determined to reduce nacelle vibration;
       determining a second pitch signal based on the velocity signal, the second pitch signal being determined to reduce nacelle vibration;
       determining a collective pitch reference for the pitch-adjustable rotor blades, the collective pitch reference being determined based on a rotor speed and a sensor value; and
       applying a resulting pitch signal to the pitch-adjustable rotor blades, the resulting pitch signal being a sum of the collective pitch reference, the first pitch signal, and the second pitch signal.

12. The wind turbine according to claim 11, wherein the collective pitch reference is determined by feedback control based on minimizing a speed error between the rotor speed and a reference rotor speed.

13. The wind turbine according to claim 11, wherein the resulting pitch signal is applied to the pitch-adjustable rotor blades in a full load control mode.

14. The wind turbine according to claim 11, wherein the position of the nacelle is indicative of a positioning of the nacelle in a fore-aft direction, or wherein the velocity of the movement of the nacelle is indicative of the velocity of the movement of the nacelle in the fore-aft direction.

* * * * *